United States Patent [19]

Kolenc et al.

[11] Patent Number: 4,684,106
[45] Date of Patent: Aug. 4, 1987

[54] VALVE

[75] Inventors: Terrence J. Kolenc, Mentor; Carl R. Bork, Jr., Euclid; William C. Steiss, Parma; Earl D. Shufflebarger, Mentor; William P. Tobbe, Lyndhurst, all of Ohio

[73] Assignee: Nupro Company, Willoughby, Ohio

[21] Appl. No.: 835,774

[22] Filed: Mar. 3, 1986

Related U.S. Application Data

[63] Continuation-in-part of Ser. No. 482,218, Apr. 5, 1983, Pat. No. 4,606,374.

[51] Int. Cl.$^4$ .............................................. F16K 31/50
[52] U.S. Cl. ............................... 251/335.2; 251/335.1; 251/367
[58] Field of Search .................. 251/335.1, 367, 335.2, 251/335.3

[56] References Cited

U.S. PATENT DOCUMENTS

| | | | |
|---|---|---|---|
| Re. 30,989 | 7/1982 | Bake et al. | 251/335 |
| 706,423 | 8/1902 | Kleinfeldt | 222/399 |
| 999,333 | 8/1911 | Patock | 251/229 |
| 1,108,146 | 8/1914 | Deegan | 92/101 |
| 1,118,649 | 11/1914 | Halter | 137/68.1 |
| 1,120,707 | 12/1914 | Froehlich | 236/99 R |
| 1,210,891 | 1/1917 | Blanchard et al. | 137/116.5 |
| 1,485,792 | 3/1924 | McKay | 251/335.2 |
| 1,497,275 | 6/1924 | Hench | 251/335.2 |
| 1,662,291 | 3/1928 | Bastian | 251/274 |
| 1,703,531 | 2/1929 | Hyde | 137/505.42 |
| 1,749,774 | 3/1930 | McKay | 251/272 |
| 1,804,721 | 5/1931 | Valmore | 251/335.2 |
| 1,843,068 | 1/1932 | Von Wangenheim et al. | 137/510 |
| 1,890,505 | 12/1932 | Forbes | 251/128 |
| 1,895,591 | 1/1933 | Spencer | 60/529 |
| 1,976,851 | 10/1934 | Landis | 251/24 |
| 2,061,028 | 11/1936 | Forbes et al. | 251/31 |
| 2,144,754 | 1/1939 | Forbes | 251/31 |
| 2,209,956 | 8/1940 | Chase et al. | 221/73.5 |
| 2,277,395 | 3/1942 | Franck | 251/24 |
| 2,382,235 | 8/1945 | Lamar | 251/31 |
| 2,460,168 | 1/1949 | Caserta | 18/59 |
| 2,642,255 | 6/1953 | Lindgren | 251/32 |
| 2,667,786 | 2/1954 | Spaulding | 73/398 |
| 2,679,760 | 6/1954 | Harland et al. | 73/395 |
| 2,697,581 | 12/1954 | Ray | 251/129 |
| 2,715,009 | 8/1955 | Beekley | 251/61 |
| 3,093,086 | 6/1963 | Altoz et al. | 103/150 |
| 3,294,408 | 12/1966 | Smith | 251/335.2 |
| 3,322,142 | 5/1967 | Baumann | 137/334 |
| 3,351,088 | 11/1967 | Jensen | 137/517 |
| 3,585,328 | 6/1971 | Fiore | 200/83 B |
| 3,699,998 | 10/1972 | Baronowski, Jr. | 251/367 |
| 3,982,729 | 9/1976 | Tricini | 251/214 |
| 3,995,723 | 12/1976 | Holcomb, Jr. | 188/72.4 |
| 4,029,296 | 6/1977 | Hartmann et al. | 251/331 |
| 4,171,792 | 10/1979 | Bass | 251/335 |
| 4,199,850 | 4/1980 | Velan | 29/157.1 |
| 4,304,260 | 12/1981 | Turner et al. | 137/613 |
| 4,354,666 | 10/1982 | McHale | 251/335 |
| 4,462,568 | 7/1984 | Taylor et al. | 251/335.2 |

FOREIGN PATENT DOCUMENTS

| | | | |
|---|---|---|---|
| 1076458 | 2/1960 | Fed. Rep. of Germany . | |
| 1291302 | 3/1969 | Fed. Rep. of Germany | 251/335.1 |
| 1177123 | 3/1969 | France . | |
| 780169 | 4/1969 | France . | |
| 279118 | 12/1927 | United Kingdom . | |
| 624488 | 6/1949 | United Kingdom | 251/335.1 |
| 773533 | 4/1957 | United Kingdom . | |
| 909468 | 11/1959 | United Kingdom . | |
| 1012101 | 8/1963 | United Kingdom . | |
| 1096234 | 5/1964 | United Kingdom . | |
| 1260934 | 4/1968 | United Kingdom . | |
| 1150666 | 11/1974 | United Kingdom . | |
| 1525502 | 11/1974 | United Kingdom . | |

Primary Examiner—A. Michael Chambers
Attorney, Agent, or Firm—Fay, Sharpe, Beall, Fagan, Minnich & McKee

[57] ABSTRACT

A valve including indicating means for indicating overtravel of an operating member beyond its normally closed position for warning that replacement of a seal is necessary. A diaphragm valve has a diaphragm of a material which withstands repeated flexing and is clamped in a unique manner.

11 Claims, 9 Drawing Figures

VALVE

BACKGROUND OF THE INVENTION

This application is a continuation-in-part of commonly assigned, co-pending application Ser No. 482,218, filed Apr. 5, 1983, now U.S. Pat. No. 4,606,374, issued Aug. 19, 1986 for "Valve".

This application relates to the art of valves and, more particularly, to valves having means for indicating various operating conditions thereof, and to diaphragm valves of the type having a diaphragm clamped between body and bonnet members. Although the invention will be described with particular reference to diaphragm valves and rotatably operable valve membrs, it will be appreciated that the invention has broader applications, and that certain individual features thereof may be used with other types of valves and/or in other environments.

Diaphragm valves of known types include a circular diaphragm clamped in a circumferential area between body and bonnet members. The diaphragm fails after a certain number of cycles and may also fail due to the manner in which it is clamped. It has been considered desirable to develop a diaphragm valve which included a diaphragm of increased strength capable of withstanding a greater number of cycles before failure. Such a valve would include means for clamping the diaphragm in a manner insuring good diaphragm sealing while minimizing stress failures.

Valves commonly include indicating means for indicating various flow positions of the valve member. In many applications where metal seal packless valves are used indication of flow position is critical from a safety standpoint. In previous arrangements. indication of flow position was designated by a simple marking or required the operator to recognize handle orientation relative to the valve body. In the latter case, some types of mountings prohibit this type of recognition.

In previous arrangements, the rotatable operating member is restricted from being moved beyond the set, off position of the valve. If overtravel beyond the off position without adjustment of the valve is not possible, two problems will result after seal wear has occurred. First, the valve cannot be shut off, and second, the handle could be broken by an operator attempting to forcedly close the valve.

When there is no stop means for stopping the operating member in its off position, the operating member may inherently overtravel beyond the off position due to seal wear. Only a highly skilled person would be aware that at some point such overtravel would signify that replacement of the seal was necessary, and there was no associated means for indicating the point at which such seal replacement was necessary. Therefore, it would be desirable to have an alarming indicating means for clearly indicating to an operator that a seal is worn beyond its normal, useful life and that replacement is necessary.

The subject invention meets the foregoing needs and others, and provides a new and improved valve construction.

SUMMARY OF THE INVENTION

A diaphragm valve of the type described includes a circular diaphragm of austenitic stainless steel having a hardness not less than 38 on the Rockwell C scale. The austenitic stainless steel is preferably of AISI type 316.

In accordance with the present application, the diaphragm is axially clamped in a circumferential area inwardly of its outer periphery between opposed flat and parallel clamping surfaces. It has been found that diaphragm discs normally have a burr on the outer peripheral edge thereof due to stamping of same from a sheet. When attempts are made to clamp the outer periphery of the diaphragm between opposed surfaces, the burr prevents high pressure squeezing on mating flat surfaces of the diaphragm.

In a preferred arrangement, the diaphragm is clamped in axially and radially spaced circumferential areas connected with one another by an axially bent diaphragm portion. The maximum squeeze or clamping force is applied to the diaphragm at the inner circumferential area and the diaphragm is bent across relatively sharp corners.

The diaphragm is clamped between body and bonnet members, one of which includes an axially extending outer circumferential flange for protecting the clamping surface of the member on which it is provided. The other member includes a circumferential recess opposite from the circumferential flange for accommodating the outer periphery of the diaphragm in free and unclamped relationship.

The diaphragm valve includes a valve member on one side of the diaphragm having a non-circular head slidably guided in a cylindrical bore. The non-circular arrangement of the enlarged head is such that fluid flow can occur therepast for purging. The valve member includes a cylindrical stem axially guided in the bore through a guide washer having a non-circular inner surface to accommodate fluid flow therepast for purging purposes.

The diaphragm valve constructed in accordance with the present application can be actuated in a plurality of manners, including manual and remote actuating means. The arrangement specifically shown in the present application includes a manually operated rotatable operating member. However, it will be appreciated that the manually rotatble operating member of the present application is not required for operating the diaphragm valve, and that it can be used with valves of other types.

The invention also relates to a valve which includes a bonnet having a rotatable operating member for moving a valve member between open and closed positions. The valve member carries a wearable seal cooperable with a valve seat in the valve member closed position. The valve member is rotatable between open and closed positions, and the closed position includes angular ranges over which the seal is effective. One range includes a normal angular range over which the seal is in satisfactory condition, and a second range includes an overtravel or abnormal angular range over which the seal is still functional but should be replaced.

In accordance with the present application, indicating means is provided between the valve operating member and the valve bonnet for indicating overtravel of the operating member beyond the normal closed position thereof to indicate that replacement of the seal is necessary.

In a preferred arrangement, the indicating means of the present application includes means for indicating a range of normal angular closed positions and a range of abnormal closed angular positions for the operating member. When the operating member overtravels beyond the normal closed position, the operator will be readily aware that replacement of the seal is necessary.

In a preferred arrangement, the indicia for indicating overtravel of the operating member takes the form of adjacent arcuate bands of different color on an indicator ring mounted on the bonnet for cooperation with an indicator on the operating member. When the seal is satisfactory, the indicator on the operating member is aligned with the color band indicating normal valve closure. When the seal is worn and requires replacement, the indicator on the operating member is aligned with the color band indicating overtravel or that replacement of the seal is required.

In one arrangement, the indicating means includes an indicating ring member mounted on the valve bonnet beneath the operating member. Specifically, the indicating ring member is mounted on an outer cylindrical end portion of the valve bonnet, and is held thereto by frictional engagement. The indicating ring member includes a central opening or hole receiving an outer cylindrical end portion of the valve bonnet, and has axially extending flange means surrounding the opening for frictionally gripping the outer end portion of the valve bonnet.

Locating means is provided between the locating ring member and the valve bonnet for locating the ring member in a desired rotated position for locating the indicia thereon at the desired angular location. The locating means may take many forms and, in one arrangement, includes a longitudinal groove in the outer end portion of the bonnet receiving an inwardly extending tab on the indicating ring member. The tab on the indicating ring member is located a predetermined distance from the indicia thereon, and the groove in the bonnet is located a predetermined distance from a stop surface which normally cooperates with a stop projection on the operating member to stop same in the valve open position.

The indicating ring member includes an inclined surface having the indicia thereon and being visible in directions both parallel and perpendicular to the longitudinal axis of the operating member. The indicating ring member also includes an outer flange for concealing a panel mounting nut threaded on the bonnet.

The principal object of the present invention is the provision of an improved diaphragm valve which is very economical to manufacture and assemble, and very reliable in operation.

Another advantage of the invention is the provision of an improved diaphragm valve having an improved diaphragm material.

A further advantage is the provision of an improved diaphragm valve having an improved arrangement for circumferentially clamping the diaphragm.

Another advantage resides in the provision of an improved diaphragm valve having an axially movable valve member with cooperating hexagonal and circular guide surfaces for allowing purging.

Still another advantage of the invention is found in the provision of a valve having a rotatable operating member and including indicating means for indicating operating member overtravel which requires replacement of a valve seal.

A further advantage of the invention is the provision of indicating means for indicating various positions of a rotatable operating member.

Yet a further advantage is the provision of an improved ring member secured to a valve bonnet in a unique manner for performing diverse functions such as concealing a panel mounting nut or providing indicating positions for the valve operating member.

Other advantages and benefits of the invention will become apparent to those skilled in the art upon a reading and understanding of the following detailed description.

BRIEF DESCRIPTION OF THE DRAWINGS

The invention may take form in certain parts and arrangements of parts, preferred embodiments of which will be described in detail and illustrated in the accompanying drawings which form a part hereof and wherein.

DESCRIPTION OF PREFERRED EMBODIMENTS

Figure 1:
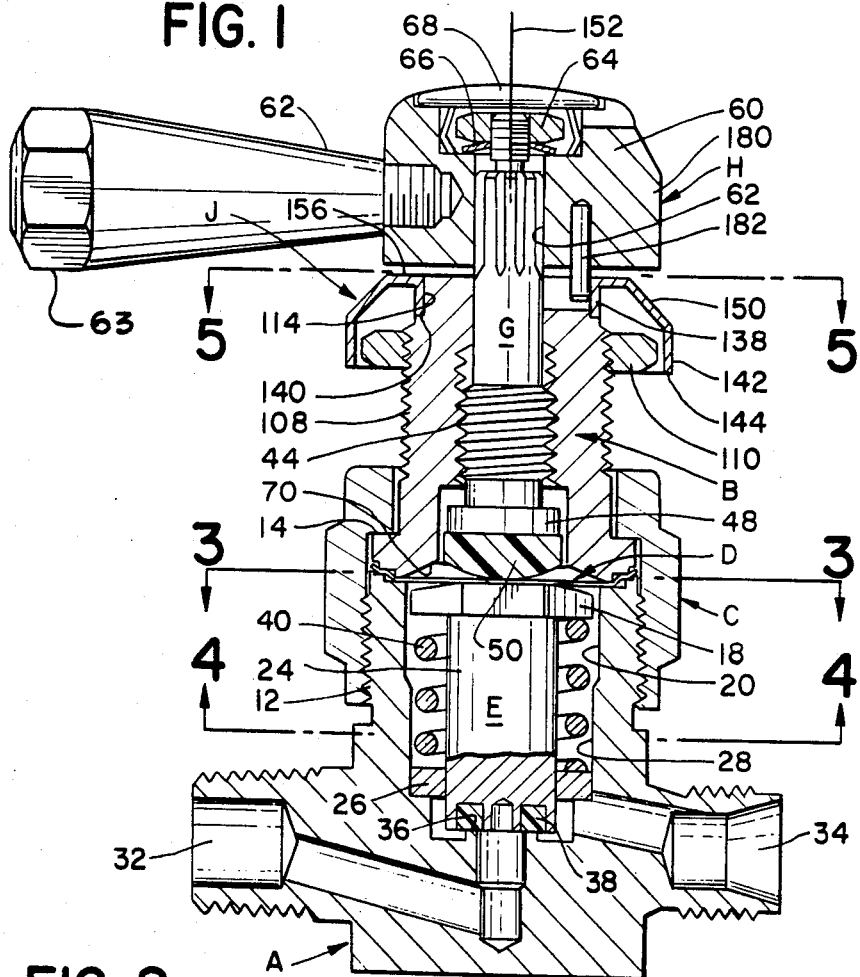
FIG. 1 is a cross-sectional elevational view of an improved valve having the features of the present invention incorporated therein.

Referring now to the drawings, wherein the showings are for purposes of illustrating certain preferred embodiments of the invention only and not for purposes of limiting same, FIG. 1 shows a valve body A and a valve bonnet B axially clamped together by a bonnet nut C in a known manner, and having a circular metal diaphragm D circumferentially clamped therebetween. Valve body A and bonnet nut C have cooperating threads therebetween generally indicated at numeral 12 for providing axial movement of bonnet nut C relative to body A upon rotational movement of bonnet nut C. Bonnet member B and bonnet nut C have cooperating generally radial shoulders 14 which abut one another for moving bonnet member B toward a body member A upon rotation of bonnet nut C in the appropriate direction to securely clamp diaphragm D therebetween.

An axially movable valve member E has an enlarged head portion 18 slidably guided in a large diameter portion of a cylindrical bore 20. The outer end portion of enlarged head 18 facing toward diaphragm D is generally spherical and the outer periphery of enlarged head portion 18 is generally hexagonal so that only the corners thereof are guided in the cylindrical bore 20, while the flats thereof provide fluid passages to accommodate valve purging. A cylindrical stem portion 24 of valve member E is slidably guided through a guide washer 26 having a cylindrical outer surface closely received in a cylindrical small diameter bore portion 28, and having a hexagonal inner surface to provide passages to accommodate purging.

Inlet and outlet ports 32,34 in valve body A communicate with the valve body bore on opposite sides of a circumferential upstanding seat 36. Fluid inlet and outlet lines (not shown) may be connected to inlet and outlet 32,34, respectively, by convenient known means. A plastic, elastomeric or metal circumferential seal ring 38 is secured to an end portion of valve member E for selective cooperation with seat 36 to prevent or allow fluid flow through the valve. In the "standard" version of the subject new valve, seal ring 38 is constructed for polytetrafluoroethylene.

Seal 38 is attached to valve member E in the manner disclosed in U.S. Pat. No. 3,623,699 issued Nov. 30, 1971, to Matousek, et al., the disclosure of which is hereby incorporated herein by reference. Briefly, the end portion of valve member E includes a circumferential recess receiving seal ring 38, and inner and outer rims on valve member E are deformed toward one another over the outer end face of the seal ring for holding same in position. This seal arrangement limits cold flow of the seal material which produces better control of the stroke of the valve. This consequently yields better control of diaphragm life which is related to stroke.

A coil spring 40 under compression between guide washer 26 and enlarged head 18 normally urges the valve member E, i.e., seal ring 38, away from seat 36 to provide fluid communication between inlet 32 and outlet 34. In the open position of valve member E, Fluid enters the entire cylindrical bore defined by large and small diameter portions 20,28. Upon closing of valve member E by movement of seal 38 back into engagement with seat 36, purging of fluid pressure within the bore is possible because the hexagonal shape of enlarged head 18 and of the interior surface of guide washer 26.

Bonnet B includes a stem G rotatably guided therein. Cooperating external and internal threads between stem member G and bonnet member B are generally indicated by numeral 44 to impart axial movement to stem member G upon rotational movement thereof relative to the bonnet. Instead of using threads, it will be recognized that many different axial operators can be provided for imparting axial movement to valve member E to effect movement between its open and closed positions, and that the manually operated rotatable operating member shown in only illustrative. An enlarged head 48 on valve stem G has a flat surface engaging a corresponding flat surface on a button 50 which, in turn, has a convex surface engaging diaphragm D on the opposite side thereof from enlarged head 18 of valve member E. The stem head and button are cooperatively mounted so as to facilitate relative rotation therebetween around the longitudinal axis of the stem. Button 50 may be of plastic or other suitable materials, and the interface between stem head 48 and the button is lubricated to assist allowing relative rotation between the stem and button instead of having the button rotate relative to diaphragm D.

A rotatable operating member generally indicated at H is provided for moving valve member E between its open and closed positions. Enlarged head 60 is splined onto stem G as at 62 for preventing relative rotation between the head and stem. An operating handle 62 is suitably connected to head 60, and may be integral therewith. In the subject embodiment, however, the handle 62 is threaded into head 60. The outer end of the handle is provided with a hexagonal configuration at 63 to facilitate tightening of the handle into head 60. A nut 64 and lock washer 66 secure head 60 to stem G, and a cover plate 61 snaps into a circular recess in the top of head 60 in a known manner. It will be recognized that valve operating member H includes head 60, handle 62, and stem G, and that operating member H is rotatable for moving valve member E axially between its open and closed positions. However, it will be appreciated that other operators may be provided if so desired for cooperating with diaphragm D to move the valve member between its open and closed positions.

Figure 2:
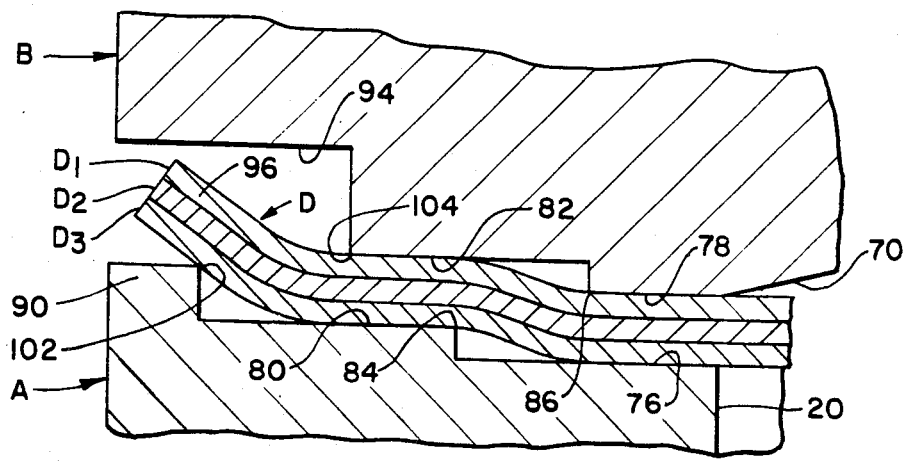
FIG. 2 is an enlarged partial cross-sectional elevational view of a peripheral edge portion of the diaphragm in the valve of FIG. 1 showing the specific arrangement of the diaphragm and the clamping surfaces between the valve body and valve bonnet.

FIG. 2 shows an enlarged peripheral edge portion of body A and bonnet B having diaphragm D axially clamped therebetween. As shown in FIG. 1, bonnet member B has a generally conical surface portion 70 extending away from diaphragm D opposite from large diameter cylindrical bore portion 20 in the valve body. Conical portion 70 and cylindrical bore portion 20 are also generally shown in FIG. 2 for reference purposes. Body member A and bonnet member B have spaced-apart opposite flat and parallel circumferential areas 76,78 between which an inner or primary circumferential area of diaphragm D is axially clamped over an inner circumferential area. Tightening of bonnet nut C in FIG. 1 moves clamping surfaces 76,78 toward one another for squeezing diaphragm D therebetween. As will be noted in FIG. 2, the circumferential area clamped between clamping surfaces 76,78 is spaced well inwardly from the diaphragm outer periphery.

Body member A and bonnet member B also include secondary flat and parallel clamping surfaces 80,82 spaced axially and radially from primary clamping surfaces 76,78. Primary surfaces 76,78 are separated from secondary surfaces 80,82 by relatively sharp corners 84,86 across which diaphragm D is bent axially as clearly shown in FIG. 2. The axial spacing between corners 84,86 is less than the normal axial thickness of diaphragm D and less than the axial spacing between clamping surfaces 76,78. As a result, corners 84,86 provide excellent seals against the opposite face surfaces of the diaphragm. Flat and parallel circumferential surfaces 80,82 are spaced-apart from one another no less than, and preferably slightly greater than, the spacing between primary clamping surfaces 76,78. The machining tolerances for body member A and bonnet member B are chosen such that the spacing between surfaces 76,78 will always provide maximum squeeze or clamping action as compared to the amount of squeeze or clamping action between surfaces 80,82. Such action insures that primary diaphragm sealing occurs at areas 76,78 to better accommodate valve purging.

Continuing with reference to FIG. 2, an outer circumferential flange 90 extends axially from secondary clamping surface 80 on body member A for protecting inner or primary clamping surface 76 against knicks and other damage during processing and assembly of the valve. The axial projection of flange 90 is substantially greater than the axial spacing between primary and secondary surfaces 76,80. Directly opposite from protective flange 90, bonnet member B is provided with an enlarged recess 94 for receiving a terminal end portion 86 of diaphragm D in a free and unclamped condition. Secondary corners generally indicated as 102,104 are axially spaced from one another a distance substantially less than the axial spacing between corners 84,86 so that the outer end portion 96 of diaphragm D is axially deformed to a greater degree than the axial deformation thereof between corners 84,86.

As a result of the foregoing relationships, opposed pairs of flat clamping surfaces 76,78 and 80,82 define axially and radially spaced clamping surfaces for axially clamping diaphragm D at radially-spaced circumferential areas. Between the inner and outer circumferential clamping areas diaphragm D is axially bent between corners 84,86.

Diaphragm D is shown as comprising three discs or layers D1, D2, and D3 of equal thickness, although a greater or lesser number of such discs could be suitably employed in some instances. It has been found that such an arrangement provides enhanced flexibility without substantially reducing the strength or life of the composite diaphragm construction. In the preferred arrangement, each disc diaphragm forming disc comprises a flat circular member of austenitic type 316 stainless steel heat treated to a hardness of not less than 38 on the Rockwell C scale. Such hardness is considered to be a "fully hardened" condition for the particular material involved, and effectively enhances the overall cycle life of diaphragm D. Normally, stainless steel diaphragms are constructed from material having a hardness of approximately 27 on the Rockwell C scale, i.e., "quarter hard". It has been found that an increase in diaphragm hardness increases its strength which, in turn, increases its cycle life in a generally linear relationship. Thus, an increase in hardness from approximately 27 to approximately 38 on the Rockwell C scale increases the diaphragm cycle life by a factor of about two. This result indeed comprises a significant improvement over prior art stainless steel diaphragm constructions. While 316 stainless steel is employed in the preferred construction, it will be appreciated that other materials and hardness relationships could be used for different types of service.

Typically, discs D1, D2, and D3 are stamped from sheet form and thus include a burr around the outer periphery thereof. The improved arrangement of the present invention, however, securely clamps the diaphragm at circumferential areas spaced radially inward from the outer periphery, so any burrs cannot possibly interfere with obtaining secure clamping and sealing. Discs D1, D2, and D3 are physically separate and are not bonded together in any way. The discs are held together simply by the clamping force exerted between the valve body and bonnet as described above. The laminated or layered diaphragm construction requires less force to flex, but has a strength which is about as great as a single layer diaphragm having the same thickness as the combined thickness of discs D1, D2, and D3.

Figure 3:
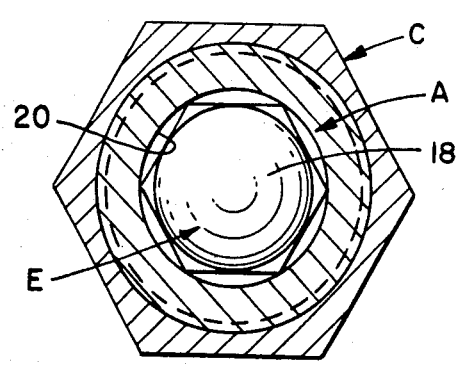
FIG. 3 is a partial cross-sectional elevational view showing the enlarged head of an axially movable valve member being guided in a cylindrical bore.
Figure 4:
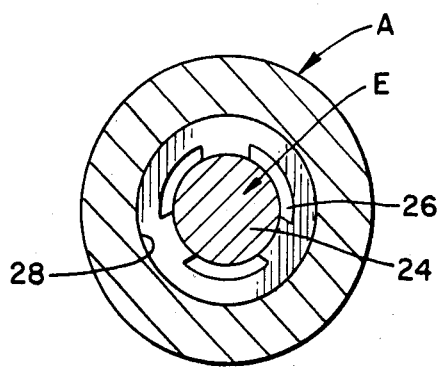
FIG. 4 is a cross-sectional elevational view taken generally along lines 4—4 of FIG. 1 showing a cylindrical portion of the valve member being axially guided through a non-circular opening in a guide washer received in a cylindrical bore.

FIG. 3 shows enlarged hexagonal head 14 on valve member E as having its corners axially guided in large diameter bore portion 20. The flat areas of the head are spaced from the wall of the bore to accommodate valve purging. FIG. 4 shows cylindrical stem portion 24 of valve member E as being axially guided by flats defined by the internal hexagonal opening in guide washer 26. Spaces are advantageously defined between cylindrical stem 24 and the corners of the non-circular interior surface of washer 26 to facilitate purging.

Bonnet B is illustrated in FIG. 1 as including an external threaded portion 108 receiving a panel nut 110. Threaded portion 108 is closely receivable through an opening in a panel (not shown), and the panel is clamped between the panel nut 110 and bonnet nut C to securely mount the valve thereto. Shims may be provided on the underside of the panel against bonnet nut C for desired location of panel nut 110 adjacent the outer end portion of bonnet B when the valve is in a mounted position.

Figure 5:
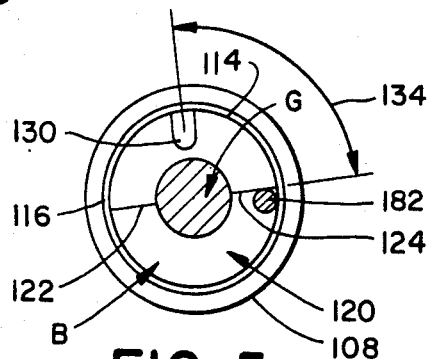
FIG. 5 is a partial cross-sectional view taken generally along lines 5—5 of FIG. 1 with the indicating ring member and panel nut removed for clarity of illustration in showing the top end portion of the valve bonnet.

As shown with primary reference to FIG. 5 and with secondary reference to FIG. 1, the outer end portion of bonnet B includes a generally cylindrical surface 114 spaced radially inward from threaded portion 108 and separated therefrom by a circumferential radial shoulder 116. Cylindrical end portion 114 is cut-away as generally indicated at 120 over an axial extent less than the distance from its outer terminal end to shoulder 116. Cut-away portion 120 has opposite axially extending end surfaces 122,124, and the axial bottom of cut-away portion 120 is axially spaced slightly from radial shoulder 116 so that an substantially complete circumferential surface still exists around the outer end portion of the bonnet. End surfaces 122,124 may be angularly spaced from one another substantially greater than 90° and less than 180°.

At least one end surface, i.e., end surface 124 defines a stop surface for stopping rotation of operating member H in its open position. A locating means in the form of an axial groove 130 is provided in the outer end portion of bonnet B. Groove 130 is angularly spaced appropriately 90° from stop surface 124 as generally indicated by angle 134, and is used for purposes to be described.

With continued reference to FIGS. 1 and 5, an indicating ring member J has a central opening or hole therethrough and is frictionally received on outer cylindrical end portion 114 of stem B. The central opening or hole includes generally axially extending flange means 138 for frictionally gripping bonnet outer cylindrical portion 114. It will be recognized that axially extending inner flange means 138 may be circumferentially continuous or may comprise a plurality of circumferentially-spaced flanges for frictionally or resiliently gripping the bonnet outer cylindrical portion.

Inner flange 138 includes a terminal end 140 which normally abuts shoulder 116 (FIG. 5). Ring member J includes a generally axially extending outer circumferential flange 142 having a terminal end 144 axially spaced a substantial distance away from the terminal end 140 of inner flange means 138. Outer flange 142 surrounds, covers, and conceals panel nut 110 when the valve is mounted to a panel. A circumferential inclined surface 150 extends from outer flange 142 toward the central opening in the ring member. In the arrangement shown, inclined surface 150 is inclined at an angle of approximately 45° to longitudinal axis 152 of bonnet B, stem G and operating member H. A small circumferential horizontal portion 156 extends between inclined surface 150 and the central opening in ring member J. Inclined surface 150 is located relative to head 60 and positioned such that it is visible in directions both parallel and perpendicular to longitudinal axis 152.

Figure 6:
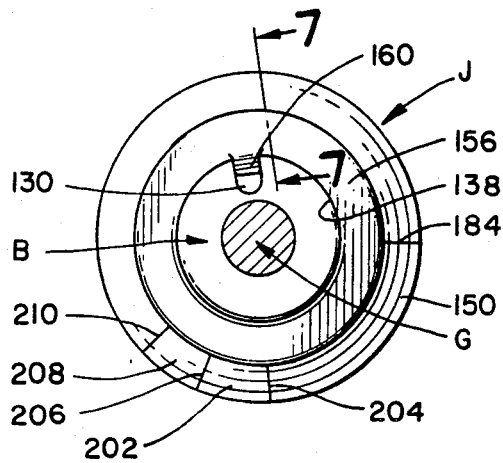
FIG. 6 is a view similar to FIG. 5 for showing a tab on the indicating ring member cooperating with a longitudinal groove in the valve bonnet to prevent relative rotation therebetween.

As shown in FIG. 6, axially extending inner flange 138 on ring member J includes a radially inward extending tab 160 for close reception in groove 130 of bonnet member B. Tab 160 may take many forms, including an inclined inwardly extending portion of flange 138, or a perpendicularly extending tab from thee bottom edge of the flange. Groove 130 and tab 160 cooperate with one another to properly locate indicating ring member J relative to bonnet B for positioning certain indicia on ring member J in the proper location.

Figure 7:
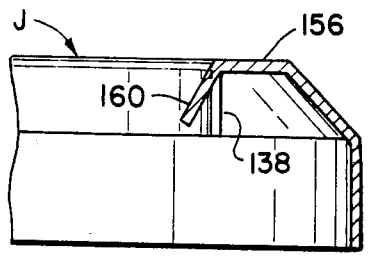
FIG. 7 is a side elevational cross-sectional view taken generally along lines 7—7 of FIG. 6.
Figure 8:
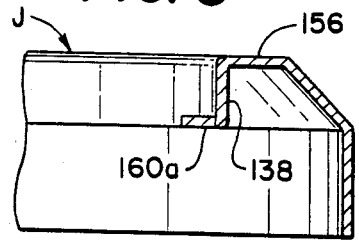
FIG. 8 is a view similar to FIG. 7 for showing an alternative arrangement.

As shown in FIG. 7, tabl 160 is shown as simply comprising an inwardly inclined slit portion from circumferential flange 138. FIG. 8 shows tab 160a as comprising a generally radially inward extending extension from the bottom end of inner flange 138.

Figure 9:
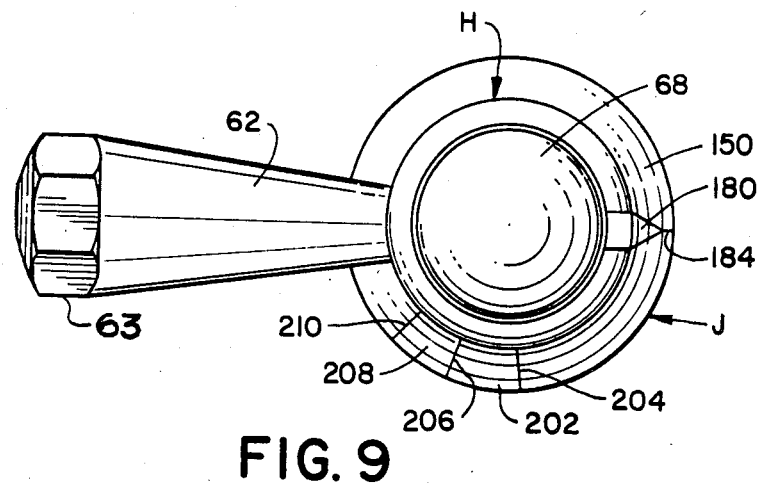
FIG. 9 is a plan view of the valve handle shown in FIG. 1.

Referring to FIGS. 1 and 9, operating means H includes a pointer or indicator means 180 and a stop pin 182. Upon rotation of operating member H to its full open position, pointer or indicator means 180 will be aligned with an indicator line 184 on inclined surface 150 of indicating ring member J. In this position, stop pin 182 carried by head 60 will engage stop surface 124 (FIG. 5) for stopping rotation of the valve operating member in its full open position. In this position, coil spring 40 moves valve member E axially upward in the view of FIG. 1 to its full open position wherein seal 38 is axially displaced from seat 36.

When the valve is closed, handle 62, i.e., operating member H, is rotated clockwise in the view of FIG. 9 until pointer 180 is located in a closed normal angular range 202. This range is defined between radial lines 204,206 arcuately spaced apart from each other by an angle of approximately 27.5°, with line 204 being located slightly less than 90° from line 184 and line 206 being located greater than 90° therefrom. An abnormal angular range generally indicated by numeral 208 extends between radial lines 206,210 over an angle of approximately 22.5° adjacent range 202. In the preferred arrangement, area 202 is colored green between lines 204,206 to provide an arcuate band of one color for indicating a normal closed position for the valve when pointer 180 is aligned therewith. When seal 38 is unduly worn so that replacement thereof is or soon may be necessary, pointer 180 will overtravel beyond normal closed range 202 into abnormal angular range 208. Range 208 is colored red for indicating and alarming an operator that replacement of seal 38 is necessary.

Cut-out end surface 122 (FIG. 5) is angularly spaced well beyond warning band 208 so that stop pin 182 (FIG. 1) on operating member H will not engage surface 122, even through pointer 180 is approaching travel beyond warning area 208. Adjacent contrasting color bands 202, 208 are located on inclined surface 150 so they are readily visible in directions both parallel and perpendicular to longitudinal axis 152.

It will be recognized that valve open position indicia 184 on ring member J has a predetermined angular relationship with locating means 160 and with indicating means 202,208. This relationship is such that assembly or disassembly of the valve always insures that indicating ring member J is installed in proper position because of the necessary alignment of locating means 130,160. This properly locates color bands 202,208 in the closed position of the valve member with respect to a rotatable valve operating member.

It will also be recognized that the improved arrangement of the present application provides cooperating indicating means between operating member H and bonnet B for indicating overtravel of operating member H in its closed position to thereby indicate that replacement of seal 38 is required. In the arrangement shown and described, the indicating means takes the form of an indicator 180 on operating member H and indicating bands 202,208 on an indicating ring member J attached to bonnet B. However, it will be recognized that many other arrangements are possible without departing from the overall intent or scope of the invention. Furthermore, instead of merely indicating open and overtravel positions of an operating member, it will be appreciated that indicating ring member J can be used for many other purposes, including concealment of panel nut 110 and the performance of other indicating functions having appropriate indicia thereon.

The improved indicia arrangement of the present application indicates the open position of the valve, a normal angular range of closed positions, and an abnormal range of closed positions. Thus, the user of the valve can readily determine visually whether the valve is open, closed, or that the seal requires replacement. The simplified manner of attaching the indicator ring member to the valve bonnet makes it possible to easily remove and replace the valve, or to renew its components. The indicating ring member accommodates this capability by having locating means defined by cooperating groove 130 and tab 160 for properly positioning ring member J with its indicating bands 202,208 in the desired circumferential location.

Although the invention has been shown and described with respect to certain preferred embodiments, modifications and alternations will occur to others skilled in the art upon a reading and understanding of this specification. It is intended to include all such modifications and alternations insofar as they come within the scope of the claims or the equivalents thereof.

Having thus described the invention, it is now claimed:

1. First and second body members each having a generally annular end face, means for clamping said body members together with said annular end faces in axially aligned face-to-face relationship, a relatively thin circular metal seal member having a continuous peripheral edge portion clamped between said end faces, said end faces each defining a separate corner with the corner on said first end face located radially inward of the corner on the second end face and axially offset relative thereto, said peripheral edge portion of said metal seal member extending over and being bent across each of said corners, said end faces further defining first and second pairs of substantially flat and parallel clamping surfaces which respectively engage said metal seal member in radially spaced circumferentaily continuous first and second seal areas, said first seal area lying radially inward of said first corner generally coplanar therewith, and said second seal area lying radially outward of said second corner generally coplanar therewith.

2. The invention as defined in claim 1 wherein first and second clamping surfaces lie in parallel planes.

3. The invention as defined in claim 1 wherein said first pair of clamping surfaces extend generally perpendicular to the axes of said end faces.

4. The invention as defined in claim 1 wherein said second pair of clamping surfaces extend generally perpendicular to the axes of said end faces.

5. The invention as defined in claim 4 wherein said first pair of clamping surfaces extend generally perpendicular to the axes of said end faces.

6. The invention as defined in claim 1 wherein said corners are radially spaced from one another a distance substantially greater than the thickness of said seal member.

7. An arrangement for providing a fluid tight seal between mating body components of a fluid control device comprising:
   a first body component having an axis and an annular end face located radially outwardly of said axis;
   a second body component having an annular end face positioned in axially aligned face-to-face relationship with the end face on said first body component;
   a relatively thin circular metal seal member having a peripheral edge portion positioned between said end faces;
   means for axially clamping said first and second end faces into sealing engagement with said seal member;
   said end face on said first body component having a first generally flat annular clamping surface lying axially inward of an outwardly extending corner which extends circumferentially about said clamping surface;
   said end face on said second body component having a first generally flat annular clamping surface which opposes and is parallel to the first clamping surface on said first body component and terminates in a corner lying in the plane of said first clamping surface on said second body component at a location radially inwardly of the corner on said first body component, said corners on said first and second body components being radially spaced a distance greater than the thickness of said seal member and axially spaced a distance less than the thickness of said seal member, said first body component further including a second generally flat annular clamping surface lying in the plane of said first corner of said first body member radially outward thereof, said second body member including a second generally flat annular clamping surface lying radially outwardly of said first corner on said second body member for cooperation with said second clamping surface on said first body member, and said peripheral edge portion of said seal member extending between and bent across said corners and clampingly engaging by said first and second clamping surfaces on said first and second body members to provide circumferentially continuous axially offset primary and secondary seal areas respectively located radially inwardly and radially outwardly of said corners.

8. The invention as defined in claim 7 wherein said clamping surfaces on said first and second body components are generally perpendicular to the axis of said first body component.

9. In a fluid flow control device including first and second mating body components having axially aligned annular end faces engaged with the opposite sides of the periphery of a thin circular metal diaphragm the improvement wherein each end face of each body component comprises a pair of substantially flat circumferentially extending clamping surfaces formed at axially spaced locations lying in parallel planes and cooperating with the pair of clamping surfaces on the end face of the other body component to clampingly engage said diaphragm in a pair of radially spaced and axially offset continuous circumferential bands, each pair of clamping surfaces on each end face being separated by a corner which lies in a plane which includes one of said clamping surfaces, the corner on the end face of said first body component lying in the plane of the radially innermost clamping surface and the corner of the end face of the second body component lying in the plane of the radially outermost clamping surface, said corners on said first and second body portions being radially spaced a distance at least slightly greater than the thickness of said diaphragm such that said diaphragm is bent across and between said corners intermediate said continuous circumferential bands.

10. The improvement as defined in claim 9 wherein the outer periphery of said diaphragm lies radially outwardly of the outermost clamping surface.

11. The improvement as defined in claim 9 wherein said clamping surfaces lie in planes perpendicular to the axes of said annular end faces.

* * * * *